Jan. 7, 1964   U. V. HELAVA   3,116,555
PHOTOGRAMMETRIC PLOTTER
Filed Dec. 1, 1958   10 Sheets-Sheet 1

INVENTOR
UUNO VILHO HELAVA

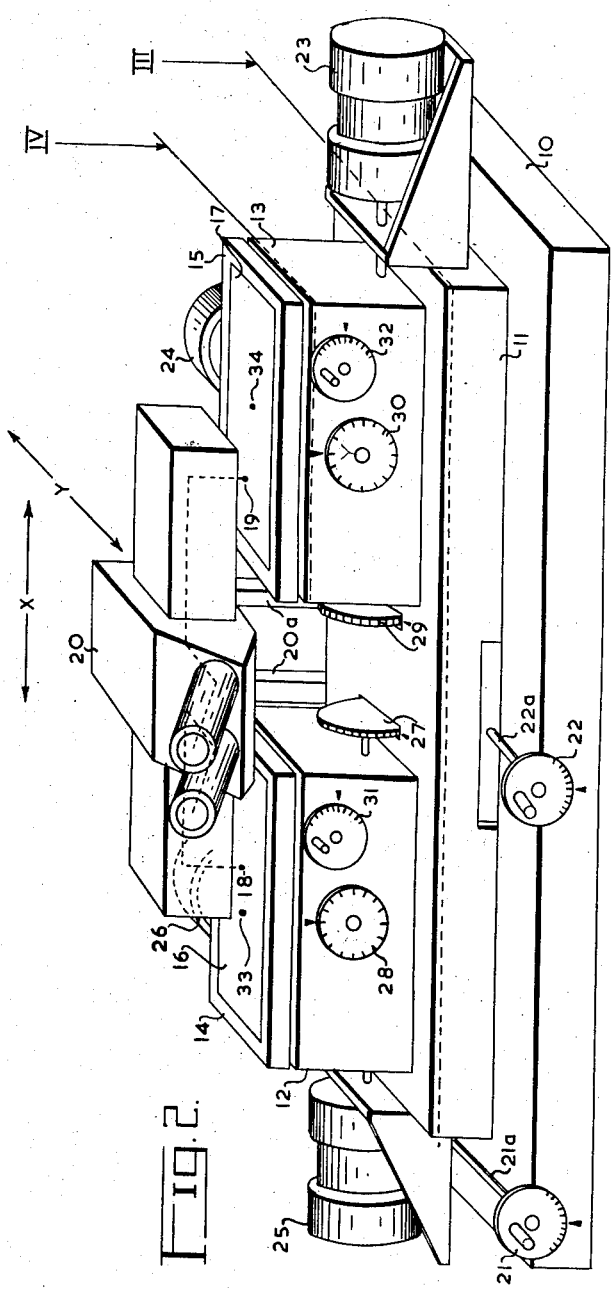

Jan. 7, 1964
U. V. HELAVA
3,116,555
PHOTOGRAMMETRIC PLOTTER
Filed Dec. 1, 1958
10 Sheets-Sheet 3
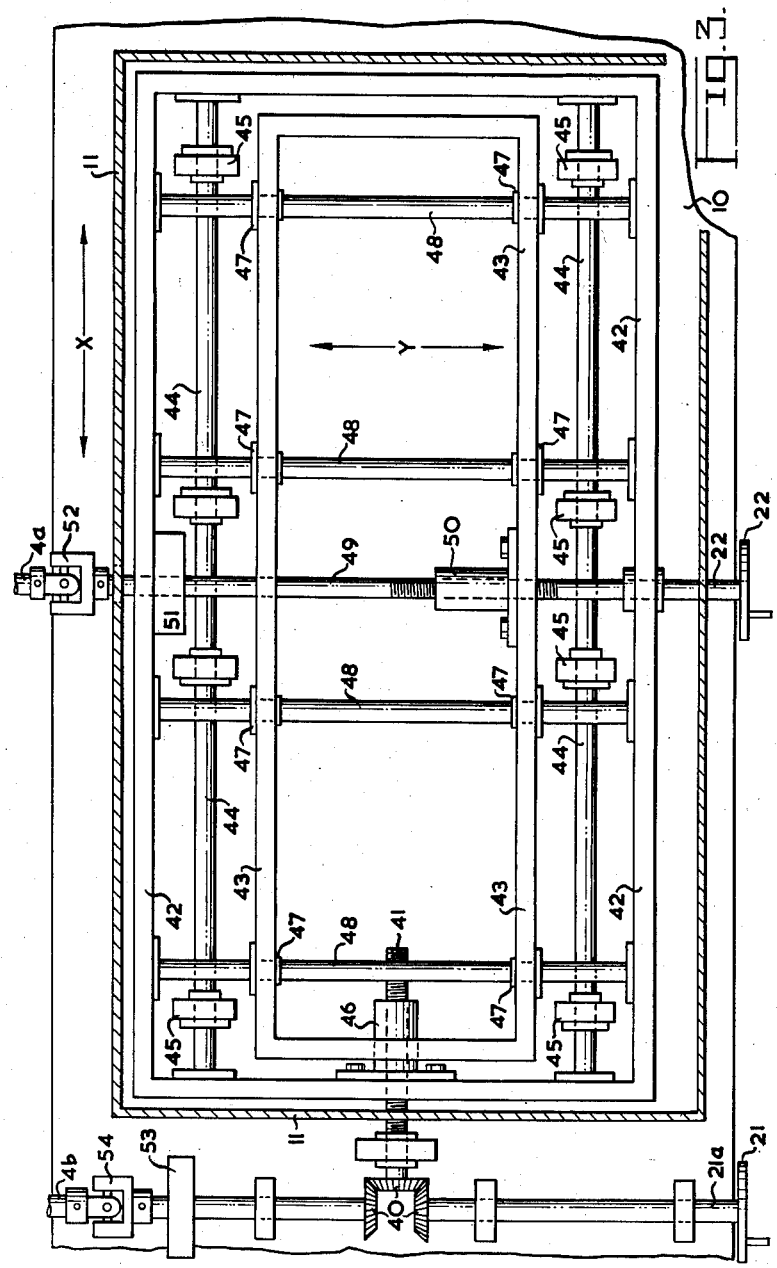
INVENTOR
UUNO VILHO HELAVA
BY
ATTORNEYS Jan. 7, 1964
U. V. HELAVA
3,116,555
PHOTOGRAMMETRIC PLOTTER
Filed Dec. 1, 1958
10 Sheets-Sheet 4
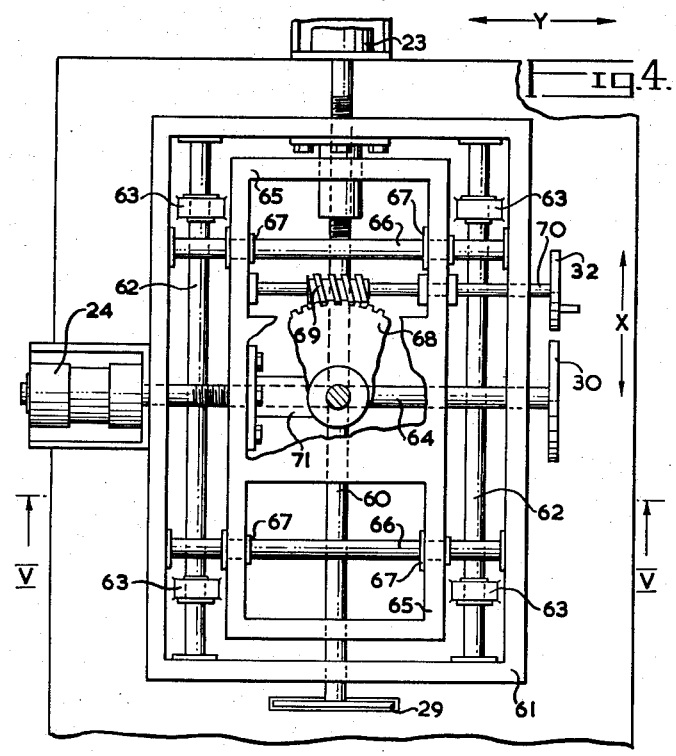
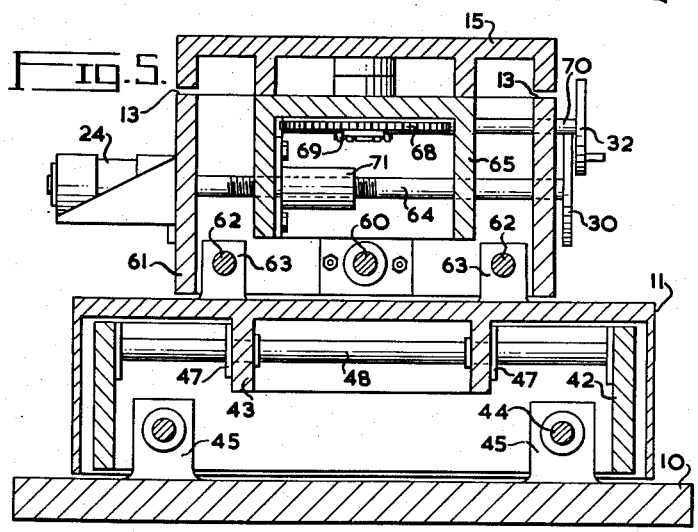
INVENTOR
UUNO VILHO HELAVA
BY: Cushman, Darby & Cushman
ATTORNEYS

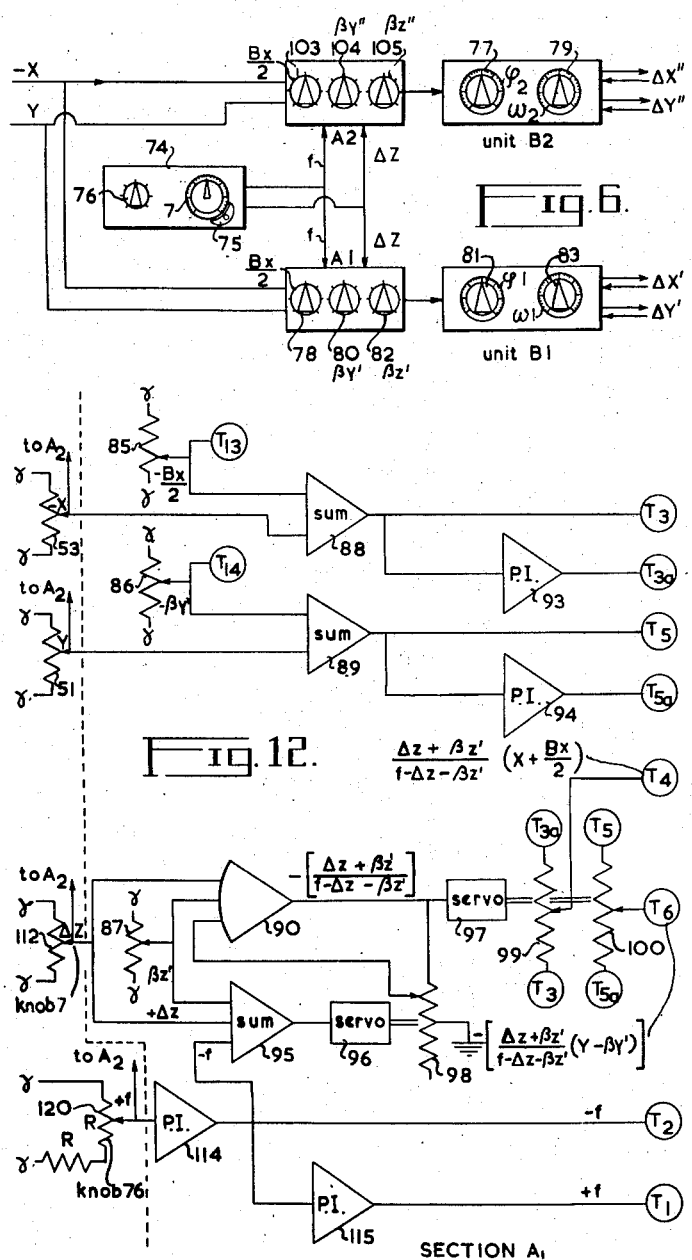

Jan. 7, 1964  U. V. HELAVA  3,116,555
PHOTOGRAMMETRIC PLOTTER
Filed Dec. 1, 1958  10 Sheets-Sheet 6

UUNO VILHO HELAVA
BY: *Cushman, Darby + Cushman*
ATTORNEYS

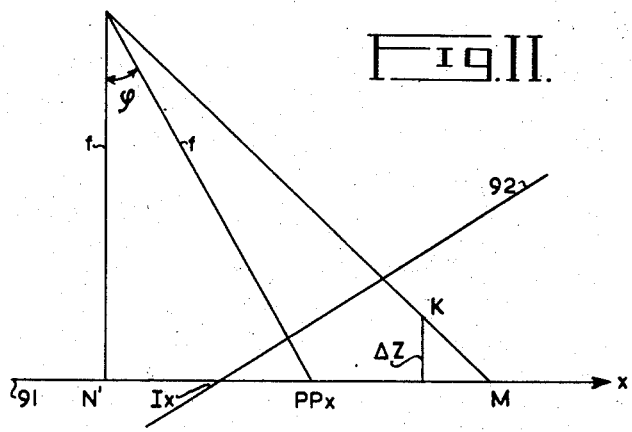
Fig. II.
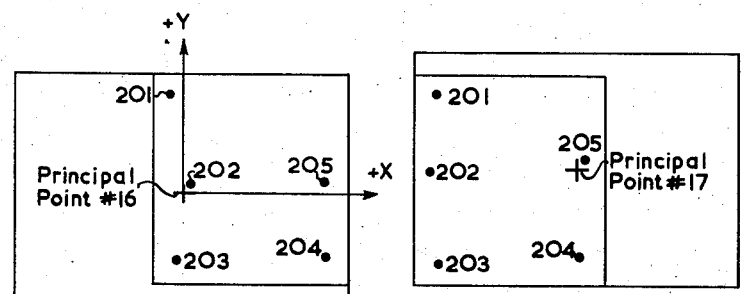
Fig. 15.
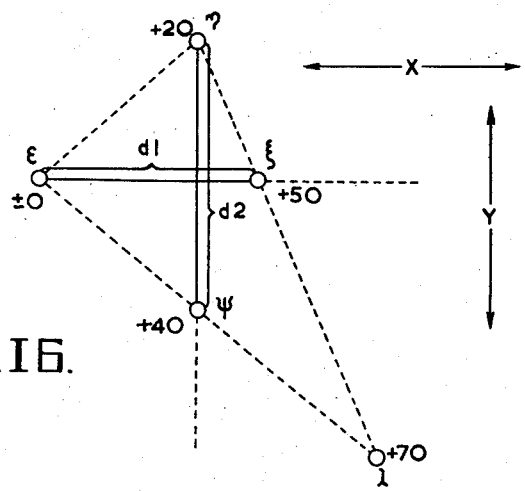
Fig. 16.
UUNO VILHO HELAVA

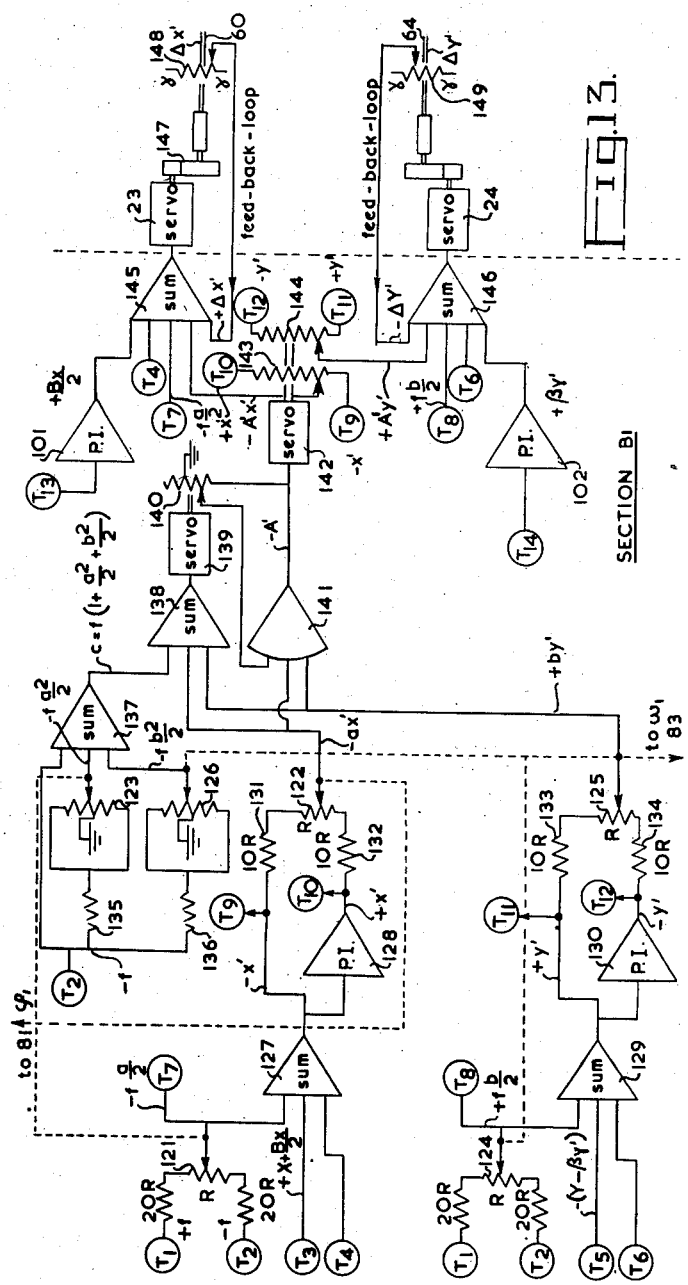

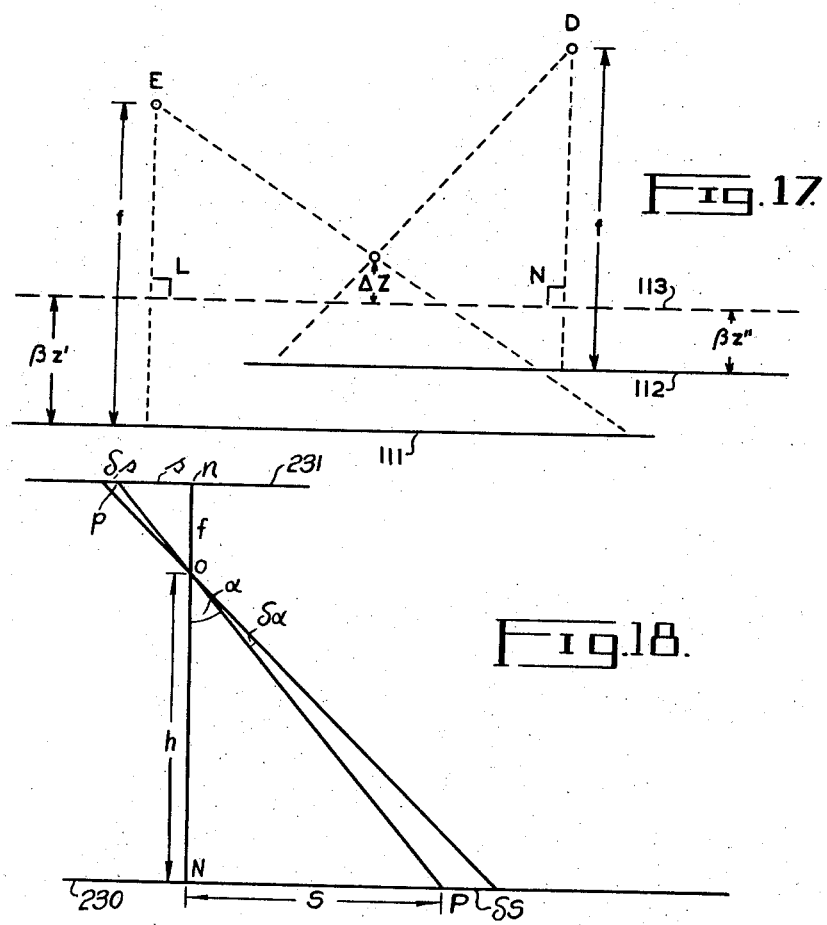
Fig. 17.
Fig. 18.
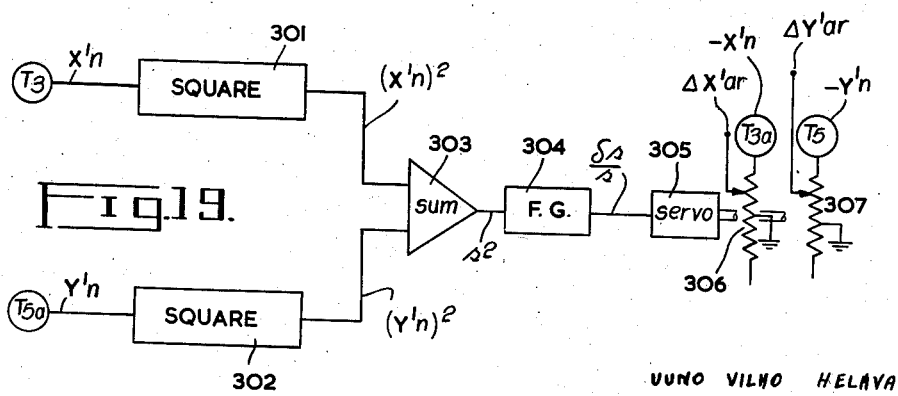
Fig. 19.

United States Patent Office 3,116,555
Patented Jan. 7, 1964

3,116,555
PHOTOGRAMMETRIC PLOTTER
Uuno Vilho Helava, Ottawa, Ontario, Canada, assignor, by mesne assignments, to Canadian Patents and Development Limited, Ottawa, Ontario, Canada, a company
Filed Dec. 1, 1958, Ser. No. 777,359
10 Claims. (Cl. 33—20)

The present invention relates to a method and apparatus for photogrammetric mapping. This application is a continuation-in-part of my copending application, Serial No. 680,699, filed August 28, 1957, now abandoned.

It is well known that the most rapid method of surveying large areas is to employ aerial photography. If a large number of consecutive aerial photographs of the region concerned are obtained, an approximate mosaic map may be made up by joining them together. If the scale, the orientation of the map, and the true position of one point on the map are known, then the true position of any other point may be deduced.

This brief description gives some indication of the methods employed in photogrammetry but it will be quite clear that they suffer from a number of inherent difficulties. The first of the problems is that aerial photographs very seldom are identical to a plan view or orthogonal projection of the earth beneath and a photograph is almost always produced having its plane tilted with respect to the horizontal plane passing through the point vertically beneath the camera. Whilst the aircraft attempts to maintain a fixed heading when taking a succession of photographs, wind gusts and other variations will cause the heading to vary from one photographing position to the next and this in turn will lead to relative rotation of the images in overlapping photographs. Any aircraft height variations from image to image will produce a variation in scale from one image to the next. Variations in atmospheric density lead to inconsistencies due to refraction of light received by the camera, and the lens structure of the camera itself causes distortions of the image positions. The curved surface of the earth and shrinkage of the film are other items to be accounted for.

Two of the most important inaccuracies in the photographs in an approximate mosaic map are those due to tilt and relative rotation of the photographs. The inaccuracies due to the particular lens structure used in the photographing camera may be overcome by projecting an image of the photograph from an apparatus having the same lens characteristics as those of the camera. If the projector is then arranged with its axis not at right angles to the plane of the paper upon which a print of the photograph is to be made, but at an angle equal to that made between the axis of the photographing camera and the horizontal plane at the point of intersection of the camera's axis with the earth, then the inaccuracies due to tilt will be removed. The same object may be accomplished using a more complicated instrument called a rectifier which is made for the purpose. Differences of scale from one image to the next can be eliminated by variation of the magnification from negative to print. Having removed the tilt and scale inaccuracies, rotation of one photograph print relatively to an adjacent one will align the two in the same direction. A set of adjacent prints could thus be fitted together to form a more accurate mosaic map providing the areas surveyed were reasonably flat.

However, when there are height variations from point to point on the ground, displacements on the map will be introduced, since a photograph represents a central, rather than an orthogonal projection of the ground beneath. The point directly under the camera (the nadir point) will be correctly represented on the image but any other will be displaced in a radial direction from the nadir point in a chosen reference plane by an amount which depends upon its distance from the nadir point and upon its height with respect to the plane. To obtain a true orthogonally projected map these displacements must be known, and a convenient method of determining them is to view two overlapping photographs stereoscopically. This is convenient for not only may we determine the discrepancies, but at the same time measure the height of any image point on the three dimensional stereoscopic image in relation to the chosen reference plane.

Various methods of carrying out the process are in use. One apparatus uses a system of rods arranged in a three dimensional manner to reconstruct a model of the rays from ground to camera, another (British Patent 764,449) uses two mechanisms to calculate the difference between the position of a point shown on a photograph and the true orthogonal projection position. This is achieved by solving an equation containing the coordinates of the image point on one photo and the parallax (or coordinate difference referred to the same origin) between this point and the corresponding point on a second overlapping photo. For the first mentioned apparatus in projecting the negative's image not only must it be possible to tilt the negative about two axes and rotate it about one but once having tilted the negative it must be possible to move it relatively to measuring and viewing devices without altering the plane in which it is tilted, or to move the measuring and viewing devices relatively to the photographs. Thus, this first machine has to be fairly large and very precisely made, if the accuracy of the photograph is to be matched by the projecting machine. The second type of machine, whilst less bulky than the first, gives only an approximate solution of the photogrammetric problems. Whilst it would be theoretically possible to design very expensive pieces of apparatus to correct for atmospheric refraction, earth curvature, film shrinkage and other systematic errors, the inaccuracies introduced in practice, due to the extra mechanical linkages required, are likely to outweigh the defects to be corrected.

The object of the present invention is to provide improvements in respect of these disadvantages, and to this effect I have invented a stereo comparator system which employs simple mechanical structure, with which a very high degree of accuracy may however, be obtained. The system provides for direct viewing of the photographs without parallax in which it is unnecessary to tilt the photos, but in which nevertheless relative orientation of the photographs and absolute orientation of the stereoscopic image may be attained, and in which any lens distortion or other known error may conveniently be corrected. My invention therefore provides a very versatile plotter for images taken with any type of camera, and under a wide variety of exposure conditions.

An object of the invention is to provide a photogrammetric plotter or stereo comparator comprising a mounting base; a main carriage mounted on the base with two degrees of translational freedom of movement in one plane relatively to the base and in which the plane defines a datum plane; first and second photocarriers each mounted on the main carriage so as to be movable relatively thereto with two degrees of freedom of movement and each such photocarrier defining a photo supporting surface; (these surfaces are planar in the preferred form and are parallel to the datum plane); each such surface adapted to receive a pair of overlapping photographs; a first operating means for controlling movements of the main carrier in both directions of movement of the main carrier; first and second driving means for controlling respectively both the translational movements of the first photocarrier; third and fourth driving means for controlling respectively both the translational movements of the second photocarrier (in the preferred form these driving means are electric motors) a viewer device having measuring mark means associated with each photo-supporting surface, signal generating means sensitive to movements of the main carriage; an electronic computer having an input and an output, the input being connected to receive signals from the signal generating means; second operating and signal generating means connected to the computer input for imparting a signal corresponding to a parallax or lack of alignment observed between the measuring mark means and an image feature when viewing overlapping photographs placed on each said photo-supporting surface, the computer being such as in accordance with input signals and predetermined settings to the computer corresponding to photo characteristics (i.e. variations from true orthogonal representation of the ground as a horizontal plane due to tilt of the photographing camera, atmospheric refraction and lens distortion, film shrinkage, earth curvature etc.) to generate output signals, and means for applying the output signals to the first, second, third and fourth driving means whereby to remove the parallax. It will be understood that one photocarrier may be fixed rigidly to the main carriage, although this would demand an additional computer to calculate the difference between movements of the main carriage and the true orthogonal coordinates of the photographed area.

According to the invention there is also provided a method comprising mounting a pair of overlapping photographs on a pair of photocarriers, viewing said photos simultaneously to observe the parallax between the two representations of a single image feature in relation to measuring mark means, moving the two photo-carriers as a unit relatively to the measuring mark means, detecting two coordinates of such movement, and generating signals corresponding thereto, feeding said signals to the input of an electronic computer, applying settings to the computer corresponding to known photo characteristics (e.g. those due to tilt of the photographing camera, atmospheric refraction, lens distortion, film shrinkage, earth curvature, etc., which cause the photographs to vary from being true orthogonal projections of the ground), feeding further signals determined by said observed parallax to said computer, calculating in said computer a group of output signals, and moving said photo-carriers relatively to one another and to said measuring mark means in accordance with said output signals, said signals being of such nature as to effect relative movements of said photo-carriers such as to bring each representation of said image feature into coincidence with said measuring mark means.

In the description which follows, and which provides an example of the present invention, reference will be made to the following drawings in which;

FIGURE 2 is enlarged view in perspective of the stereoscopic viewer of FIGURE 1.

FIGURE 3 is a sectional view of the lower movable table of FIGURE 2 taken on plane III—III in FIGURE 2.

FIGURE 4 is a sectional view of the photo-carrier table of FIGURE 2 taken on plane IV—IV in FIGURE 2.

FIGURE 5 is a sectional view of the structure of FIGURE 2 taken on plane V—V in FIGURE 4.

FIGURE 6 is a general block diagram of the computer of FIGURE 1.

FIGURE 11 is a vertical sectional diagram in the plane containing the $x$ axis of a tilted and an untilted photograph having the same projection centre;

FIGURE 12 is a schematic diagram of portion $A_1$ of the computer;

FIGURE 13 is a schematic diagram of portion $B_1$ of the computer;

FIGURE 15 is a plan view of two overlapping photographs in exploded view;

FIGURE 16 is a plan view of a tilted 3-dimensional projected model;

FIGURE 17 is a sectional view of two adjacent photographs being projected;

FIGURE 18 shows a diagram of the rays from the ground to the photographing negative;

FIGURE 19 shows a schematic diagram of an additional computer for calculating corrections due to atmospheric refraction.

Figure 1:
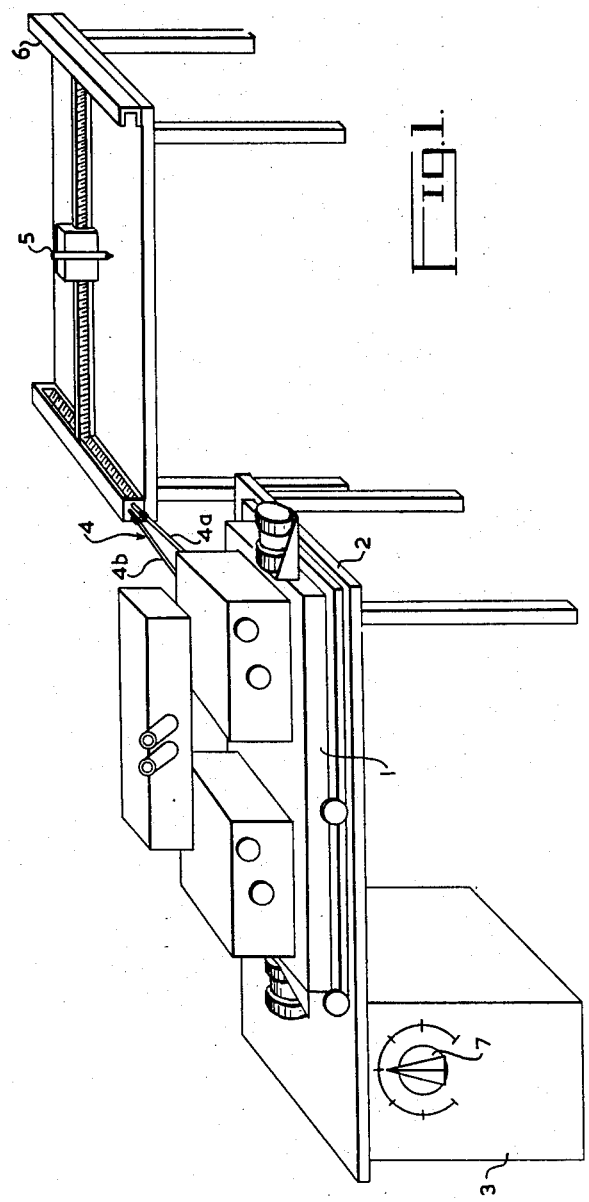
FIGURE 1 is an overall diagrammatic view in perspective of an embodiment of the invention, showing the stereoscopic viewer, plotting table, and computer.

In FIGURE 1 an overall view of the complete plotting apparatus is shown. A stereoscopic viewing assembly 1 mounted on a suitable table 2 cooperates with a computer 3 and plotting table 6. Settings set on the viewing assembly 1 during operation of the apparatus are transmitted by conventional mechanism 4 shown here as shaft transmission to a pencil 5 of plotting table 6. These settings are also transmitted electrically to the computer 3 together with settings from a control 7 and corrective compensating signals are returned electrically from the computer 3 to the assembly 1.

In FIGURE 2 the viewing assembly 1 of FIGURE 1 is shown in greater detail. The base portion 10 is fastened to the table 2. Upon this, mounted to move in two horizontal directions at right angles is a carrier 11, and on this again are mounted two further carriers 12 and 13 also movable in two directions at right angles relatively to carrier 11 and parallel to the directions of movement of carrier 11. The carriers 12 and 13 are surmounted by two photocarriers 14 and 15 respectively each of which may rotate about a vertical axis through central points 33 and 34 respectively. Photographs 16 and 17 are shown in position mounted on the photocarriers 14 and 15. In this way a point 18 on photo 16 and corresponding point 19 of photo 17 may be brought into position for examination through a conventional binocular viewer 20 which is mounted rigidly to base plate 10 by supports 20a. Handwheels 21 and 22 on shafts 21a and 22a enable precise movement of carrier 11 in the lateral (X) and depth (Y) directions respectively. Carrier 13 can be moved relatively to carrier 11 in the X direction by motor 23 and in the Y direction by motor 24. Similarly carrier 12 is moved relatively to carrier 11 in the X direction by motor 25 and in the Y direction by motor 26. The relative movement in X and Y directions of carrier 12 to carrier 11 is recorded by dials 27 and 28, and movement of carrier 13 relatively to carrier 11 is recorded by dials 29 for the X direction and 30 for the Y direction. Two further handwheels 31 and 32 are provided to rotate photocarriers 14 and 15 about their vertical axes.

FIGURE 3 shows a plan view of drive mechanism for carrier 11. This mechanism consists firstly of a frame 42 mounted by means of rods 44 mounted in bearings 45 fixed to plate 10, so that it may slide in the X direction. The frame 42 is driven by wheel 21 and shaft 21a through bevel gearing 40, which acts to rotate shaft 41 and to screw its threaded end into collar 46 fixed to frame 42. A second frame 43 is mounted by bearings 47 on rods 48 attached rigidly to frame 42. Movement of this second frame 43 is thus permitted in the Y direction relatively to frame 42 and is effected by rotating shaft 49 from wheel 22 and shaft 22a. Shaft 49 screws into collar 50 which is fixed to frame 43. Carrier 11 is mounted upon frame 43. By continuing shaft 49 beyond collar 50 coupling may be made to a potentiometer 51. The shaft 49 is further extended through this potentiometer 51 to a universal joint 52 and to shaft 4a of shaft transmission 4 and thence to plotting table 6. A drive from bevel gearing 40 is taken to a second potentiometer 53 and through a second universal joint 54 to shaft 4b and hence to the plotting table 6.

The sections of FIGURE 4 and FIGURE 5 show the drive mechanism for carrier 13. The X and Y movements relatively to carrier 11 are executed in an exactly analogous manner to those for carrier 11, the only difference being in the method of driving the X and Y shafts. Shaft 60 is rotated by motor 23, which moves frame 61 in the X direction, such frame being supported by rods 62 mounted in bearings 63 mounted upon carrier 11. Shaft 64 is rotated by motor 24 mounted on frame 61. This transfers motion to a collar 71 mounted on a frame 65 to move such frame in the Y direction relatively to frame 61 with rods 66 sliding in bearings 67. Frame 65 is rigidly fixed to and supports carrier 13. Indicating dials 30 and 29 show the amount of rotation of shafts 64 and 60 respectively. A gear wheel 68 is mounted to rotate about a vertical axis through point 34 and is fixed to frame 65. The gear 68 is driven by worm 69 coupled to hand-wheel 32 by shaft 70. The photocarrier 15 is directly mounted upon gear wheel 68.

The computer 3 shown diagrammatically in FIGURE 6 consists of two similar units, one associated with each photograph. For convenience of drawing each unit has been subdivided into two and that for the first photo is shown in FIGURES 12 and 13 consecutively (FIGURE 12 being called portion $A_1$ and FIGURE 13 portion $B_1$). Each unit A is fed signals in the form of D.C. voltages corresponding to the settings of carrier 11 for the X and Y directions from the potentiometers 53 and 51. Further inputs are also provided by knobs 76 and 7 which correspond to the focal length of the surveying camera and the height of the point being observed in the viewer 20. Further other inputs to both A and B units are provided for, but these will be explained later. The dial for pointer 7 is mounted so that it may be rotated relatively to panel 74 upon which it is mounted, and is clamped by nut 75 as required.

The output from $B_1$ controls the position of shaft 60 (carrier 13) through motor 23 for X movements and of shaft 64 through motor 24 for Y movements. Provision is made for feeding back a voltage from each motor corresponding to the position of the shaft which it drives in the conventional manner for servo mechanisms. Control through motors 25 and 26 by unit $B_2$ is effected in the same manner.

Let us now examine the situation when a three dimensional image is projected from two overlapping photographs of a sample of terrain taken with the camera axes vertically.

Figure 7:
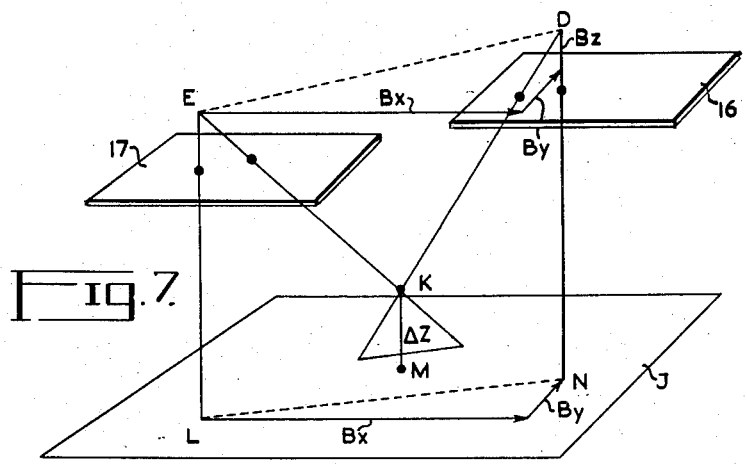
FIGURE 7 is a 3-dimensional diagram of two photographs arranged to project a 3-dimensional image.

In FIGURE 7, D and E are the projection centres for photographs 16 and 17. In order that horizontal lines on the image projected shall correspond with original horizontal lines on the ground, the line joining D and E called the base line must be tilted at the same angle as the line joining the two points from which the photographs were taken. (This is part of the absolute orientation of the three dimensional model.) In general the line ED can be divided into three components, at right angles, $Bx$ in the X direction, $By$ in the Y direction and $Bz$ vertically (these are called the base components). By increasing the distance ED, the 3-dimensional model may be increased in size (or reduced in scale). This will of course simultaneously move the model downwards. The height $\Delta Z$ of a typical point K on the image may be determined relatively to orthogonally projected point M in a convenient horizontal reference plane J. L and N are the nadir points for E and D respectively in this plane, and the distances EL and DN are called the projection distances for the two photographs.

Figure 8:
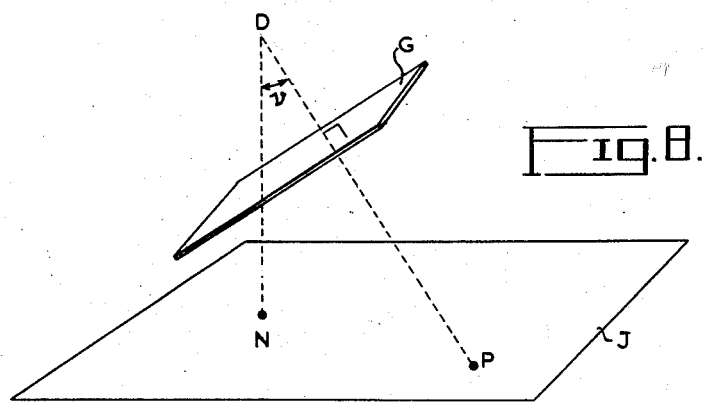
FIGURE 8 is a 3-dimensional diagram of a tilted photograph projected.

If the original photograph G were not taken with a vertical camera axis but with the axis making an angle $\nu$ with the vertical, we might use conventional methods and mount the projector axis at the same angle as the camera as shown in FIGURE 8. DP making a right angle with the plane of G the projector's axis DP now strikes J at P instead of N but the reasoning of FIGURE 7 is still correct.

One convenient way of viewing the photos so as to produce a 3-dimensional effect is to present optically a direct view of one photograph to one eye and the other to the other eye with a binocular assembly such as is shown at 20 in FIGURE 2. If a mark is placed in the path of the light in each optical unit, the eyes of the viewer will combine the two marks to give one, having a definite position in space and whose apparent distance from the viewer may be changed by altering the angle that light from each mark in the viewing assembly makes with the eyes of the viewer. This mark is called the floating mark. If now two corresponding points of the same image feature on each photo representing a single point on the ground are brought to coincidence with the mark in their respective optical units, then the single combined point will be seen at the same distance from the viewer as the floating mark. It will be understood that the floating mark will define plane J of FIGURE 7 and alteration of the projection distances EL and DN will allow K to be brought into this plane and thus allow measurement of its elevation from the amount of change in the projection distances. It will be understood that coincidence of the same image feature on the two photos could be carried out by superimposing both photos over a single measuring mark, instead of using stereoscopic presentation. In general, a second image feature brought into view keeping the two photos fixed relatively will not be seen coincidently with the floating mark because of height differences, differences caused by central projection, lack of absolute orientation, tilt of the photos, etc. However, the amount by which the two representations of the second image feature are shifted from coincidence may be determined mathematically. Then by means of a suitable computer, and independent shifting servo-mechanisms for each photo, removal of the parallax in the second feature i.e. bringing it into coincidence with the floating mark, can be made to give the height and map or orthogonal coordinates of the second feature with respect to the first.

To achieve this the computer must of course be set up with information about the photo characteristics, and these may comprise tilt, lens distortion of the camera, film shrinkage, atmospheric refraction of light reaching the camera lens, earth curvature, etc., before the measurements described can take place.

Figure 9:
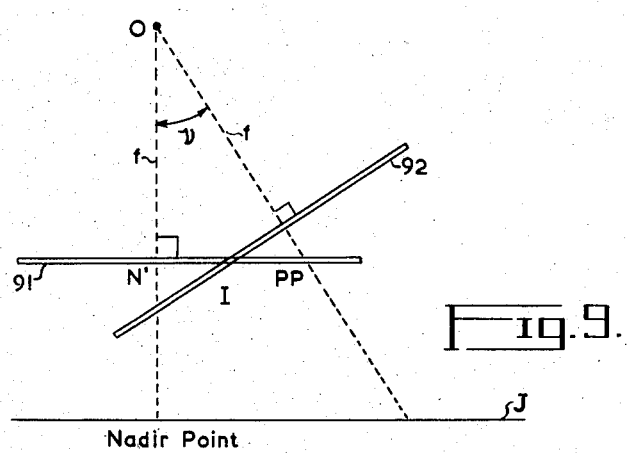
FIGURE 9 is a vertical section showing a tilted and an untilted photo having the same projection centre.

In order to realise the system described above we must first calculate the difference in the coordinates of a point shown on an untilted photograph and one of the same terrain, which is tilted at some angle. In FIGURE 9, the horizontal photograph 91 and the tilted photograph 92 are shown in section in the plane containing the angle of greatest tilt $\nu$. The photographs are placed with their planes at a distance $f$ (the focal length of the camera objective) from centre O. For photograph 91 the principal axis of the camera would strike the photograph in point N' or the plane J at the nadir point. The principal axis of the camera for 92 strikes photo 91 in point P.P. The intersection of 91 and 92 takes place at I and is called the isocentre.

Figure 10:
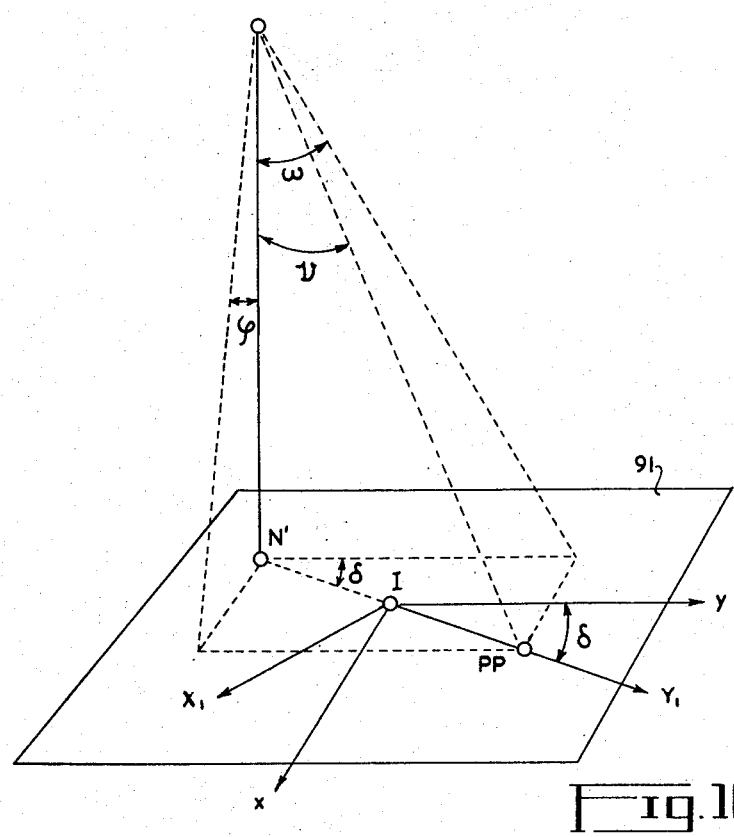
FIGURE 10 is a 3-dimensional diagram of the details of a tilted and an untilted photograph having the same projection centre.

Turning now to FIGURE 10, which shows part of FIGURE 9 in 3-dimensions we have according to O. V. Gruber (Ferienkurs in Photogrammetrie 1930) that the difference $\Delta X_1$ and $\Delta Y_1$ between tilted and untilted coordinates is (1)
$$\Delta X_1 = X_1.A$$
$$\Delta Y_1 = Y_1.A$$

In (1)
$$A = \frac{Y_1 \sin \nu}{f + Y_1 \sin \nu}$$

coordinates $X_1$ and $Y_1$ are the untilted ones and the coordinates system is such that the $X_1$-axis is in coincidence with the equal scale line of the photos 91 and 92 through the isocenter, i.e. the X axis for the tilted photo coincides with that for the untilted ($X_1$) and the Y axis for the tilted photo is at right angles to its X axis in the plane of the tilted photo. The Y axis for the untilted photo is $Y_1$ and is in the direction of greatest inclination ($\nu$). The origin is at the isocenter. Thus taking the origin at the isocenter, the coordinates of a point representing a given terrain feature on the tilted photo referred to the isocenter as origin (with its X and Y axes as just defined) will differ from those for the point representing the same terrain feature on the untilted photo referred to the isocenter as origin (with the axes $X_1$, $Y_1$) by $\Delta X_1$ and $\Delta Y_1$.

Let us assume another system of coordinates $(x, y)$ that differs from the previous one by being rotated about the origin by an angle $\delta$, in the plane of 91.

The angles $\delta$ and $\nu$ may be expressed in terms of angles $\phi$ and $\omega$ which are related to the $x$ and $y$ coordinate system as indicated in FIGURE 10.
Then $$\tan \nu = \frac{\sqrt{f^2 \tan^2 \phi + f^2 \tan^2 \omega}}{f} = \sqrt{\tan^2 \phi + \tan^2 \omega}$$

(2)
$$\sin \nu = \frac{\sqrt{\tan^2 \phi + \tan^2 \omega}}{\sqrt{1 + \tan^2 \phi + \tan^2 \omega}}$$

(3)
$$\tan \delta = \frac{\tan \phi}{\tan \omega}; \text{ thus}$$

(4)
$$\sin \delta = \frac{\tan \phi}{\sqrt{\tan^2 \phi + \tan^2 \omega}}$$

(5)
$$\cos \delta = \frac{\tan \omega}{\sqrt{\tan^2 \phi + \tan^2 \omega}}$$

(6)
$$\begin{cases} Y_1 = y \cos \delta - x \sin \delta \\ X_1 = x \cos \delta + y \sin \delta \end{cases}$$

Hence (7)
$$\begin{cases} Y_1 = \dfrac{y \tan \omega - x \tan \phi}{\sqrt{\tan^2 \phi + \tan^2 \omega}} \\ \text{and} \\ X_1 = \dfrac{x \tan \omega + y \tan \phi}{\sqrt{\tan^2 \phi + \tan^2 \omega}} \end{cases}$$

Now we can compute the value of A:

$$A = \frac{Y_1 \sin \nu}{f + Y_1 \sin \nu}$$

i.e. $= \dfrac{Y_1 \sqrt{\tan^2 \phi + \tan^2 \omega}}{\sqrt{1 + \tan^2 \phi + \tan^2 \omega} \left( \dfrac{f + Y_1\sqrt{\tan^2 \phi + \tan^2 \omega}}{\sqrt{1 + \tan^2 \phi + \tan^2 \omega}} \right)}$ $$A = \frac{Y_1 \sqrt{\tan^2 \phi + \tan^2 \omega}}{f \sqrt{1 + \tan^2 \phi + \tan^2 \omega} + Y_1 \sqrt{\tan^2 \phi + \tan^2 \omega}}$$

i.e. $A = \dfrac{y \cdot \tan \omega - x \cdot \tan \phi}{f \sqrt{1 + \tan^2 \phi + \tan^2 \omega} + y \tan \omega - x \tan \phi}$ (8)
$$A = G - G^2 + G^3 - \ldots$$

where $$G = \frac{y \tan \omega - x \tan \phi}{f \sqrt{1 + \tan^2 \phi + \tan^2 \omega}}$$

Since:

$$\frac{Y_1}{\Delta Y_1} = \frac{X_1}{\Delta X_1} = \frac{y}{\Delta y} = \frac{x}{\Delta x} = \frac{1}{A}$$

We may write:

(9)
$$\Delta y = A.y$$
$$\Delta x = A.x$$

[Where $\Delta y$ and $\Delta x$ are the difference between the tilted and untilted coordinates referred to the isocenter as origin in the $x$ and $y$ coordinate system.]

Now $\tan^2 \phi$ and $\tan^2 \omega$ are in practice very small. Therefore $\sqrt{1 + \tan^2 \phi + \tan^2 \omega}$ is very nearly equal to 1. This approximation can be accepted in most of the practical applications, and for these cases

(10) $f \sqrt{1 + \tan^2 \phi + \tan^2 \omega} \approx f \left( 1 + \dfrac{\tan^2 \phi + \tan^2 \omega}{2} \right) = C$ Referring to FIGURE 11 in which N' is the nadir point on the untilted photograph 91, and PP$x$ and I$x$ are the projections of PP and I of FIGURE 9 onto the $x$ axis. If X and Y are the coordinates of a point K referred to the nadir point as origin, which is of height $\Delta Z$ on the model so adjusted in scale to use the untilted photo 91 as the reference plane J, the position of K will appear at M on photo 91 and it will be clear that coordinate $x$ of point M will be given by $$x = X + \frac{\Delta Z}{f - \Delta Z} X - f \tan \frac{\phi}{2} + F_3(X)$$

where as stated, X is the orthogonal coordinate of K relatively to the nadir point.

A similar line of reasoning shows that

(11) $\quad y = Y + \dfrac{\Delta Z}{f - \Delta Z} \cdot Y - f \tan \dfrac{\omega}{2} + F_4(Y)$ where $F_3(X)$ and $F_4(Y)$ represent any known general functions in the X and Y directions respectively which may be included, viz. atmospheric refraction, etc.

If now we apply Equation 9, we obtain from FIGURE 11 the fact that the difference between the tilted photo coordinate and the untilted orthogonally projected coordinate referred to the isocenter equals $$Ax - \frac{\Delta Z}{f - \Delta Z} X$$

thence it follows that $\Delta X$ (the difference between the tilted coordinate referred to the principal point of the tilted photo and the untilted orthogonally projected coordinate referred to the nadir point) is given by

(12) $\quad \Delta X = Ax - \dfrac{\Delta Z . X}{f - \Delta Z} + 2f \tan \dfrac{\phi}{2} + F_1(X)$ Similar reasoning gives a value,

(13) $\quad \Delta Y = Ay - \dfrac{\Delta Z}{f - \Delta Z} \cdot Y + 2f \tan \dfrac{\omega}{2} + F_2(Y)$ where $F_1(X)$ and $F_2(Y)$ represent any additional known corrections which may be applied if required and which are functions of X and Y such as film shrinkage, atmospheric refraction of light reaching the camera lens, earth curvature etc.

These equations can then be applied to each photograph of a pair which overlap to give $\Delta X'$, $\Delta Y'$, $\Delta X''$ and $\Delta Y''$ as the coordinate differences for a first and a second overlapping photo respectively.

Now Equations 12 and 13 refer the changes $\Delta X$ and $\Delta Y$ to a system of coordinates having the nadir point of the particular photo considered as origin. When relating two photos to one another as is carried out in stereoscopy clearly a single origin must be chosen. A convenient place to choose this point, as it preserves the symmetry of the viewing assembly, is at the midpoint of the line joining the two measuring marks in the datum plane. This would require the replacing of X and Y, in Equations 12 and 13, by $$\left(X+\frac{Bx}{2}\right) \text{ and } (Y-\beta Y')$$

and $(Y-\beta Y')$ for the first photo and $$\left(X-\frac{Bx}{2}\right) \text{ and } (Y-\beta Y'')$$

for the second photo where $Bx$ is the base component of FIGURE 7 and the $\beta Y' - \beta Y''$ is $By$ of FIGURE 7.

A further addition to Equations 12 and 13 must be included to allow for instances where the scale of one or both of the photographs is not the same as that required for plotting as was assumed in FIGURE 11.

FIGURE 17 shows two photographs 111 and 112 having projection centres E and D respectively. Let us assume that the photographs are untilted as this will simplify the example. Suppose now that the scale in which we wish to plot occurs in the datum plane 113 such that the perpendicular distances from projection centres to plane 113 are EL and DN for the two photos respectively. Clearly, since the distance from each projection centre to its respective photograph is $f$, the shifts $\beta Z'$ and $\beta Z''$ of the planes of the photos from the datum plane are measures of the change of scale from photograph to plotting scale.

It is obvious from FIGURE 17 that in this case the $\Delta Z$ of the previous Equations 12 and 13 must be replaced by $\Delta Z + \beta Z'$ and $\Delta Z + \beta Z''$.

Therefore in applying Equations 12 and 13 to each respective photograph we obtain

(14)
$$\Delta X' = A'x' - \frac{\Delta Z + \beta Z'}{f - \Delta Z - \beta Z'}\left(X+\frac{Bx}{2}\right)+2f\tan\frac{\phi 1}{2}$$
$$-\frac{Bx}{2}+F_1(X)\cdots$$

and

(15)
$$\Delta Y' = A'y' - \frac{\Delta Z + \beta Z'}{f - \Delta Z - \beta Z'}(Y-\beta Y')+2\tan\frac{\omega 1}{2}$$
$$+\beta Y'+F_2(Y)$$

where the primes denote the first photograph, and

(16)
$$x' = \left(X+\frac{Bx}{2}\right)+\frac{\Delta Z+\beta Z'}{f-\Delta Z-\beta Z'}\cdot\left(X+\frac{Bx}{2}\right)-f\tan\frac{\phi 1}{2}+F_3(X)$$

and

(17)
$$y' = (Y-\beta Y')+\frac{\Delta Z-\beta Z'}{f-\Delta Z-\beta Z'}\cdot(Y-\beta Y')-f\tan\frac{\omega_1}{2}+F_4(Y)$$

For convenience we shall call
$$\tan\phi_1 = a \qquad (18)$$
$$\tan\omega_1 = b \qquad (19)$$

Similar expressions for $\Delta X''$ and $\Delta Y''$ referring to the second photograph can be deduced.

Let us turn now to the circuit diagram of an analogue computer 3 for determining the values $\Delta X'$ and $\Delta Y'$ from the X and Y map (or orthogonally projected) coordinates shown in FIGURES 12 and 13 combined. The input of Section $A_1$ shown in FIGURE 12 is fed from the X and Y potentiometers 53 and 51 and also by further potentiometer 120 for providing a voltage proportional to $f$, which will of course be dependant upon the particular photographing camera employed. Yet another input of value $\Delta Z$ is fed by means of knob 7 of FIGURE 6 from potentiometer 112. On portion $A_1$ itself inputs of $-Bx/2$, $-\beta Y'$ and $\beta Z'$ are provided from potentiometers 85, 86 and 87 driven by the knobs 78, 80 and 82 of FIGURE 6.

Outputs of $-Bx/2$ and $-\beta Y'$ are available at terminals $T_{13}$ and $T_{14}$ for portion $B_1$. Signals of $-X$ and $-Bx/2$ are added in summation amplifier 88 to produce an output of $$\left(X+\frac{Bx}{2}\right)$$

at terminal $T_3$ and by phase inversion in amplifier 93 to give $$-\left(X+\frac{Bx}{2}\right)$$

at terminal $T_{3a}$. In a similar way $-\beta Y'$ and $+Y$ are added in amplifier 89 to give an output of $-(Y-\beta Y')$ at terminal $T_5$ and by phase inversion in amplifier 94 one of $(Y-\beta Y')$ at terminal $T_{5a}$. A signal of $-\beta Y'$ is also made available at terminal $T_{14}$. The signal of $+f$ is fed to power amplifier 114 where it is reversed in phase and fed to terminal $T_2$, the phase is also reversed once more in power amplifier 115 and the signal is taken to terminal $T_1$.

Signals of $\beta Z'$, $\Delta Z$ and $-f$ are added in amplifier 95 and fed to servo motor 96. The output of this motor is multiplied by the output from a high gain amplifier 90 in potentiometer 98. The multiplied output from potentiometer 98 is added to $\beta Z'$ and $\Delta Z$ in amplifier 90 and the sum of these three when multiplied by the amplifier gain results in an output of $$\left[\frac{\Delta Z+\beta Z'}{f-\Delta Z-\beta Z'}\right]$$

A second servo motor 97, driven by the output of amplifier 90, which has on its shaft potentiometers 99 and 100 produces an output of $$\left(X+\frac{Bx}{2}\right)\cdot\left(\frac{\Delta Z+\beta Z'}{-f\Delta Z-\beta Z'}\right)$$

and $$-(Y-\beta Y')\left(\frac{\Delta Z+\beta Z'}{f-\Delta Z-\beta Z'}\right)$$

from these at terminals $T_4$ and $T_6$ respectively. The double bar connection from the servo motors 96 and 97 to potentiometers 98, and 99 and 100 respectively is intended to indicate that each servo motor has a shaft on which the resistive portion of the potentiometer concerned is mounted. The circuit comprising amplifier 90 and potentiometer 98 carries out a division operation, and to understand its action let us designate the quotient output from amplifier 90 as Q.

The input to amplifier 90 is $+\Delta Z$, $+\beta Z'$ and the product of Q times the output from amplifier 95. Hence, it follows, if $-\mu$ is the amplification factor of high gain amplifier 90, $$Q = -\mu(\Delta Z+\beta Z'+Q[f-\Delta Z-\beta Z'])$$

i.e.

$$Q(1+\mu[f-\Delta Z-\beta Z']) = -\mu(\Delta Z+\beta Z')$$

or

(20) $$Q = \frac{-\mu(\Delta Z+\beta Z')}{1+\mu(f-\Delta Z-\beta Z')}$$

But if $\mu$ is $\gg 1$, and in a typical amplifier 90 $\mu$ would be of the order of $10^3$, then Equation 20 becomes

(21) $$Q = -\frac{\Delta Z+\beta Z'}{f-\Delta Z-\beta Z'}$$

which is the output we require to feed to servo 97.

The second portion, section $B_1$, of the computer 3 is shown diagrammatically in FIGURE 13 and is fed at the terminals $T_1$, $T_2$, $T_3$, $T_4$, $T_5$, and $T_6$, $T_{13}$ and $T_{14}$ from the corresponding terminals of portion $A_1$. In addition, inputs related to $\phi_1$, may be introduced at potentiometers 121, 122, and 123 which are ganged together by knob 81, and those related to $\omega_I$, at potentiometers 124, 125, and 126, which are also ganged by knob 83. In the circuit shown in FIGURE 13 potentiometers 121 and 124 are each fed through a pair of series resistors each having twenty times the resistance of the resistive portion of potentiometer. Potentiometers 122 and 125 however are each fed through a pair of series feed resistors 131 and 132, 133 and 134 respectively each having ten times the resistive value of the potentiometers concerned. In this way for a given rotation of knob 83 the outputs obtained from potentiometers 121 and 124 will be, to a sufficient order of accuracy, effectively halved with respect to the outputs from potentiometers 122, 125 and 126, since the voltage existing across the resistive portion of 121 would be about one twentieth of $f$ whereas that across 122 and 125 will be respectively about one tenth $x'$ and one tenth $y'$. Although servo motors 23 and 24 are shown as part of section $B_I$, they are in fact mounted upon the viewing assembly 1. The input of $+f$ and $-f$ at terminals $T_1$ and $T_2$ is multiplied at potentiometer 121 to give $$-f\frac{a}{2}$$

(see Equation 18) at terminal $T_7$. This signal is also added to $$\left(X+\frac{Bx}{2}\right)$$

and $$\left(X+\frac{Bx}{2}\right)\left(\frac{\Delta Z+\beta Z'}{f-\Delta Z-\beta Z'}\right)$$

in summation amplifier 127 and gives an output $-x'$ at terminal $T_9$. A signal of $+x'$ is given at terminal $T_{10}$ by phase inverter 128. The inputs of $+f$ and $-f$ are also applied to potentiometer 124 so that its slider gives the product of $f$ and $b/2$ (see Equation 19) which is also made available at terminal $T_8$. Summation amplifier 129 provides an output of $+y'$ at terminal $T_{11}$ by adding the inputs from terminals $T_5$ and $T_6$, i.e. adding $-(Y-\beta Y')$ to $$-(Y-\beta Y')\left(\frac{\Delta Z+\beta Z'}{f-\Delta Z-\beta Z'}\right)$$

and to $$+f\cdot\frac{b}{2}$$

Phase inverter 130 gives an output at terminal $T_{12}$ of $-y'$. The signals $-x'$ and $+x'$ are taken to the feed resistors 131 and 132 of potentiometer 122 which provides an output of $-ax'$. Feed resistors 133 and 134 for potentiometer 125 are provided with signals of $+y'$ and $-y'$ respectively and multiplication by $b$ in potentiometer 125 gives an output of $+by'$. Potentiometers 123 and 126 are fed a signal of $-f$ from terminal $T_2$ through resistors 135 and 136 respectively. These potentiometers are wound so that the resistance from slider to central grounded point varies as the square of the angular displacement of the slider from this point. In a similar manner to that explained for potentiometers 121, 124 and 122 and 125 the values of resistors 135 and 136 are so chosen with respect to the resistive values of potentiometers 123 and 126 that the potential between the ground point and one or other ends of these resistive portions (in the particular circuit of FIGURE 13) is one fortieth of that fed in at T2 thus giving the proper output value with respect to those from the other potentiometers just mentioned of $-f/2$ times $a^2$ and $b^2$ respectively. Outputs of $$-f\frac{a^2}{2} \text{ and } -f\frac{b^2}{2}$$

are thus respectively obtained from potentiometers 123 and 126 which are added to $-f$ in summation amplifier 137 to give an output $+C$. The three signals $-ax'$, $+by'$, and $+C$ are added in summation amplifier 138 and transmitted by servo motor 139 to potentiometer 140. The double bar connection from servo motor 139 is intended to indicate that the resistive portion of potentiometer 140 is carried on the shaft of the servo motor. The signal from the slider of potentiometer 140 is fed with signals of $-ax'$ and $+by'$ to high gain amplifier 141, and the output from this is, $$\frac{by'-ax'}{C+by'-ax'}$$

which equals $A'$. The servo motor 142 drives potentiometers 143 and 144, by its shaft which carries the resistive portions of potentiometers 143 and 144 respectively, to give outputs of $-A'x'$ and $+A'y'$ respectively. The signals of $+x'$ and $-x'$ for potentiometer 143 are obtained from terminals $T_{10}$ and $T_9$, and those of $-y'$ and $+y'$ for potentiometer 144 from terminals $T_{12}$ and $T_{11}$. The action of the circuit of amplifier 141 and potentiometer 140 is a similar division operation to that carried out by amplifier 90 and potentiometer 98 in section $A_1$. Let us examine this circuit and call P the output and $\mu$ the gain of amplifier 141.
Now $$P=-\mu(by'-ax'-P[ax'-by'-C])$$

[The presence of the initial minus sign in the expression $-P[ax'-by'-C]$ might seem incorrect, but, since $[ax'-by'-C]$ is always negative because $a$ and $b$ are in practice very small compared with C, and since the slider of potentiometer 140 is located on the same side of the earth point as the end of the potentiometer 140 to which the output from amplifier 141 is applied, the multiplication process in potentiometer 140 will consist of the product of the output from amplifier 141 and of $[ax'-by'-C]$ as a positive quantity (i.e. of $-[ax'-by'-C]$) that is to say the product obtained is $-P(ax'-by'-C)$ and not $+P(ax'-by'-C)$ which casual observation might suggest.]
Hence $$P(1-\mu[ax'-by'-C])=-\mu(by'-ax')$$

and, if $\mu\gg1$ then,

(22) $$P=\frac{-(by'-ax')}{C+by'-ax'}=-A'$$

The signals $$\left(X+\frac{Bx}{2}\right)\left(\frac{\Delta Z+\beta Z'}{f-\Delta Z-\beta Z'}\right)$$

and $$-f\frac{a}{2}$$

from terminals $T_4$ and $T_7$ are added to $-A'x'$ and $Bx/2$ in summation amplifier 145, the output of which provides a signal of $-\Delta X'$ as given by Equation 12. $\Delta X'$ is then converted to a motion of shaft 60 by means of gearing 147. Potentiometer 148 whose resistive portion is carried by shaft 60 provides a feed back signal to the amplifier 145 so that there is no drive to the shaft when it has taken a position corresponding to $\Delta X'$. Summation amplifier 146 adds $+A'y'$, $$+f\cdot\frac{b}{2}, -(Y-\beta Y')\left(\frac{\Delta Z+\beta Z'}{f-\Delta Z-\beta Z'}\right)$$

and $+\beta Y'$ to give an output of $\Delta Y'$ from shaft 64. A feed back signal of $-\Delta Y'$ is provided by means of potentiometer 149 to amplifier 146. The resistive portion of potentiometer 149 is carried by shaft 64. All points $\gamma, \gamma$ are supplied with suitably stabilised and polarised D.C. potentials.

Sections $A_2$ and $B_2$ of the computer 3 operate analogously to sections $A_1$ and $B_1$ and provide analagous outputs $\Delta X''$ and $\Delta Y''$. The inputs to section $A_2$ are basically the same as to $A_1$ and consist of $Bx/2$, $\beta Y''$, and $\beta Z''$ at knobs 103, 104, and 105 respectively, and of $\phi_2$ at knob 77, and $\omega_2$ at knob 79.

In both sections $A_1$ and $B_1$ of the computer values of R have been given to certain potentiometers to provide a basis for values to be given to their feed resistors for the ranges normally required from the potentiometers.

Figure 14:
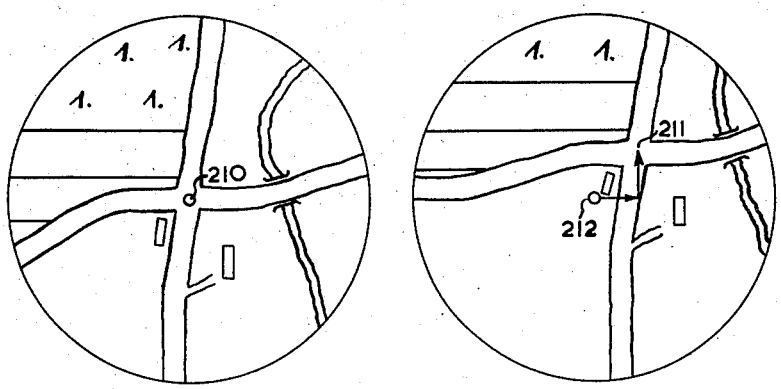
FIGURE 14 is a typical view of two overlapping photos through the binocular viewer assembly.

When it is desired to set up my apparatus for plotting it is necessary that the computer and viewing table be arranged so that movement of the X and Y controls 21 and 22 will automatically introduce the correct amounts of compensating shift $\Delta X'$, $\Delta Y'$, and $\Delta X''$ and $\Delta Y''$ transmitted through the motors 23, 24, 25 and 26, such that removal of parallax using the knob 7 will give a reading for the height of the point being observed, unaffected by discrepancies in the photographs from all causes. The setting-up procedure is very similar to methods employed for conventional machines in that firstly the two photographs 17 and 16 are aligned on their respective photo-carriers 15 and 14 so that the principal point of each photograph (that is the point where the camera axis strikes the image) is arranged at point 34 or 33 respectively. This is known as inner orientation and need not be considered further. The remaining two steps to be carried out are to remove the effect of tilt and of the rotation of one photograph with respect to the other (relative orientation) then subsequently to remove the effect of this tilt with respect to the horizontal plane of the earth (absolute orientation). Compare the alignment of ED in FIGURE 7. The relative orientation of one photograph to another may be carried out in several different ways but the process to be described will show the effective bringing of the plane of photograph 17 of FIGURE 15 into the plane of photograph 16. An image feature, well defined in the sense of being easily identified is first selected close to the principal point of photograph number 17 and is denoted here by point 205. Through the left hand optical system of the viewer 20 for photograph number 16 the operator will not normally see precisely the same point as appears for photograph number 17. In FIGURE 14 he would, for instance, see the measuring mark 210 in the left eye piece coinciding with the centre 211 of the cross roads, and viewing through the right eye piece he would notice the right hand measuring mark 212 displaced from the centre 211. The amount of shift in the X and Y directions is called the X and Y parallax, respectively. Firstly therefore the parallax of photograph 17 is removed by alteration of the $Bx/2$ and $\beta Y'$ controls (knobs 78 and 80) in the computer unit $A_1$ so that the measuring marks 210 and 212 both coincide with the centre 211 of the cross roads. Another well defined point is now selected close to the principal point of photograph 16. Let us denote this selcted point by number 202. In the viewer 20 parallaxes will again in general be observed. The Y parallax is removed by rotating photograph 17 in a horizontal plane using wheel 32. The X parallax is removed using the $Bx/2$ control as before, i.e. knob 78. The $Bx/2$ change is not essential in the setting up of the device but because of height differences between the first selected point 205 and point 202 considerable X parallax might be present, and removal of this would facilitate viewing. It will be appreciated that the introduction of the rotation does not produce much additional parallex at point 205, because the rotation axis of photograph 17 passes almost exactly through this point 205. Having thus eliminated the initial gross parallaxes, the operator now measures by the same procedure the parallaxes in at least three other points, preferably near the corners of the overlap as indicated in FIGURE 15 (201, 203, 204). The parallex in each of the chosen points 201, 202, 203, 204 and 205 is then measured, and at the same time the coordinates of these points with respect to the principal point of photograph 17 are recorded. A typical sample of the readings obtained is shown in Table I.

*Table I*

| Point | $x_2{}^m/m$ | $y_2{}^m/m$ | Y-parallax$^m/m$ |
|---|---|---|---|
| 201 | −101.646 | +74.827 | +3.633 |
| 202 | −92.234 | −0.744 | +3.913 |
| 203 | −80.844 | −87.162 | +3.454 |
| 204 | +0.905 | −82.347 | +2.820 |
| 205 | +0.932 | +0.922 | +3.878 |

It can be proved that the Y parallax observed can be approximated by the following equation:

$$(23) \quad P_Y = \frac{Y}{f} \cdot bz + \frac{XY}{f} \cdot a + \frac{Y^2}{f} \cdot b + K \cdot x + dy$$

Where $bz$ and $dy$ are related to $Bz$ and $By$, $a = \tan \phi$, $b = \tan \omega$ and $K$ is the relative rotation. The expression related to, is intended to indicate that these expressions $Bz$ and $By$ are slightly different from the instrumental base components $Bz$ and $By$ due to rotation of the photographs etc. i.e. $bz = k.Bz$ and $dy = k'.By$ where $k$ and $k'$ are constants). By substituting in this equation for the five points, five simultaneous equations are obtained in which the coefficient of the required constants are shown in Table 2.

*Table II*

| Point No. | Coefficients for— | | | | | Y-parallax |
|---|---|---|---|---|---|---|
| | bz | a | b | K | dy | |
| 201 | +0.4928 | −50.09 | +36.88 | −101.65 | +1 | +3.633 |
| 202 | −0.0049 | +0.45 | +0.00 | −92.23 | +1 | +3.913 |
| 203 | +0.5740 | +46.41 | +50.04 | −80.84 | +1 | +3.545 |
| 204 | −0.5423 | −0.49 | +44.66 | +0.91 | +1 | +2.820 |
| 205 | +0.0061 | +0.01 | +0.01 | +0.93 | +1 | +3.878 |

Any method of calculus may be used to solve the equations, a relaxation method being particularly successful. In the example taken there is obtained $bz = +1.35$, $a = +.015$, $b = -.064$, $K = .0008$, $dy = +3.86$. These values are set on the corresponding dials of the computer unit $B_1$, $dy$ being applied to the $\beta Y'$ control-knob 80, $bz$ to the $\beta Z'$ control-knob 82 and K to hand wheel 32. If any parallax is still observed in the Y direction, the measurements are again made and the new very small changes in the constants are applied.

The net result of the relative orientation is that we have a 3-dimensional model tilted in the plane of photo 16 and bearing the scale of this photo. It is subsequently thus necessary to carry out the absolute orientation of the model, in which corrections for scale and tilt of the base line (ED, FIGURE 7) are applied and secondly tilt of the cameras is corrected.

For absolute orientation at least 3 ground control points are required. These points must not be in a straight line and all three spatial coordinates of two of them and the elevation of the third must be known.

In order to bring the model to the correct scale, the distance between two ground control points is calculated and reduced to the correct scale. Let this value be D. The coordinates of the same points are measured using the stereoscopic viewing Table 1, and the distance between them is again calculated. Let this equal $d$. Usually $$d \neq D$$

but $$\frac{d}{D} = \frac{bx}{Bx} = \frac{by}{By} = \frac{bz}{Bz}$$

where $bx$, $by$ and $bz$ are the values of the base components which gave $d$. The correction in $Bx$ is made by applying half to each $Bx$ knob in the computer. Corrections to $By$ and $Bz$ will normally be made to one or other of the photographs only by means of the $\beta Y$ and $\beta Z$ knobs. The zero reading of elevation counter knob 7 will require resetting. The correction for inclination of the cameras about the X and Y axes is next determined by first measuring the elevations of the three ground control points with the invention. These elevations are usually not identical to those given by ground measurements, but the differences are a measure of the tilt of the 3-dimensional model to the horizontal. FIGURE 16 shows a plan view of the model with the three points $\epsilon$, $\eta$, and $\lambda$ where the error in the elevation of $\epsilon$ has been reduced to zero by alteration of the zero setting of knob 7. In this example errors of $+20$ in $\eta$ and $+70$ in $\lambda$ are supposed to remain. A parallel to the X axis is drawn through point $\epsilon$ to cut $\eta\lambda$ at $\xi$ and a parallel to the Y axis drawn to cut $\epsilon\lambda$ at $\psi$. By linear interpolation we can find the elevation errors in $\xi$ and $\psi$ call these $+50$ and $+40$ respectively. Clearly now if $\epsilon\xi=d_1$ and $\eta\psi=d_2$, the error of tan $\phi_1$, and $$\tan \phi_2 = -\frac{+50}{d_1}$$

and that of tan $\omega_1$ and $$\tan \omega_2 = -\frac{+40}{d_2}$$

These corrections are made to the knobs 81 and 77 for $\phi_1$ and $\phi_2$ and to 83 and 79 for $\omega_1$ and $\omega_2$ (see FIGURE 6). The knob 7 will in general have to be corrected again for elevation. It will be realized that changing the inclination of the cameras and hence of the model in this manner necessitates small changes in the base components. For instance, $B_z$ would now be too great, the correction in the example given would be $$\Delta_1 B_z + \Delta_2 B_z$$

where $$\frac{+50}{d_1} = -\frac{\Delta_1 Bz}{Bx}$$

and $$\frac{+40}{d_2} = -\frac{\Delta_2 Bz}{By}$$

corrections to the other base components are normally negligible.

Those skilled in the art will observe from the above description that the setting up of this instrument is basically no different from that employed with present highly accurate plotters, and any of the orientation methods described in the photogrammetric literature may be used instead.

It will be understood that if desired for very high accuracy corrections for lens distortion, atmospheric refraction, earth curvature, film shrinkage, and the like can be made by introducing compensating signals at suitable points in the computer.

Atmospheric refraction necessitates a correction which is a function of the distance S of the point under examination P from the nadir point (see FIGURE 18). Let 230 represent the ground (shown planar for convenience), and let 231 represent the photograph formed therefrom. (Strictly speaking corrections for the height of the point should also be included, but these are of a higher order than those due to S and may be neglected here.) If ON represents the line from projection centre O to the nadir point N, $\alpha$ the angle subtended between the direct ray from point P to O and the line NO, and $h$ the distance NO, then $S = h \tan \alpha$ i.e.

(24) $\qquad \delta S = h(1+\tan^2\alpha)\delta\alpha$ where $\delta S$ is the distance error displacement of the point P due to atmospheric refraction, and $\delta\alpha$ is the angular error displacement.

Furthermore $$\tan^2 \alpha = \frac{S^2}{h^2} = \frac{s^2}{f^2}$$

where $s$ is the distance of image point $p$ from the nadir point $n$ on the photograph, and $\delta s$ is the distance error displacement of the point $p$ due to atmospheric refraction.

Also $$S = \frac{sh}{f} \therefore \delta s = \frac{f}{h} \cdot \delta S$$

Substituting in Equation 24 we obtain:

(25) $\qquad \delta s = \left(\frac{f^2+s^2}{f}\right)\delta\alpha$

There are a number of formulas in existence for the computation of $\delta\alpha$, and whichever is found most suitable may be used for the calculation of $\delta s$ as a function of $s^2$. It is possible to design an analogue computer for the Equation 25 using known techniques, and as a second more more practical solution we may assume that values of

(26) $\qquad \frac{\delta s}{s} = F(s^2)$ are calculated in advance at suitable intervals of $s^2$. These values may be set upon an analogue function generator such that an input voltage $s^2$ will generate an output voltage equal to $\delta s/s$. Referring now to FIGURE 12, it will be seen that signals providing coordinates for each photograph having the nadir point as origin are available at terminals T3, T3a, T5, and T5a. If $X'_n$ and $Y'_n$ represent these coordinates for the first photograph, then

(27) $\qquad (X'_n)^2 + (Y'_n)^2 = s^2$

Clearly then the corrections to be applied to $\Delta X'$ and $\Delta Y'$ will be $\Delta X'_{ar}$ and $\Delta Y'_{ar}$

(28) $\qquad \begin{cases} \text{where } \Delta Y'_{ar} = -X'_n \cdot \frac{\delta s}{s} \\ \text{and where } \Delta Y'_{ar} = -Y'_n \cdot \frac{\delta s}{s} \end{cases}$ Similar equations for $\Delta X''_{ar}$ and $\Delta Y''_{ar}$ can be obtained. These corrections would be applied individually to the computers for the first and second photographs respectively and the corrections $\Delta X'_{ar}$ and $\Delta Y'_{ar}$ would be added to computer B1 in summation amplifiers 145 and 146 respectively. FIGURE 19 shows a lay-out for obtaining these corrections, in which inputs of $X'_n$ and $Y'_n$, referred to the nadir point, are obtained from terminals T3 and T5a respectively. The signals pass through squaring generators, are added to produce $s^2$, pass through function generator 304 to produce an output of $\delta s/s$. This output is applied to servo 305 for potentiometers 306 and 307. Multiplication by $-X'_n$ from terminal T3a and $-Y'_n$ from terminal T5 takes place in potentiometers 306 and 307 to produce respectively the outputs of $\Delta X'_{ar}$ and $\Delta Y'_{ar}$.

The influence of earth curvature is also a function of $s$ and may be introduced by using a similar set-up or by changing the values of $\delta s/s$ set in the function generator 304 to include this effect also.

Lens distortion in a photograph is a function of the distance $s'$ of the point under investigation from the principal point in the photograph. Now it will be recalled that the output $\Delta X'$, $\Delta Y'$, $\Delta X''$, and $\Delta Y''$ from section B of the computer are corrections which reduce the co-ordinates of the photographs referred to the principal points to orthogonal ones. Clearly therefore if we subtract the compensating values $\Delta X'$ and $\Delta Y'$, and $\Delta X''$ and $\Delta Y''$ from the orthogonal coordinates X and Y we can obtain the coordinates referred to the principal point for each photograph. A simple addition circuit could perform this. If we call these two coordinates $X'_{pp}$ and $Y'_{pp}$, then

(29) $\qquad (s')^2 = X'^2_{pp} + Y'^2_{pp}$

Lens distortion is usually available in the form of a calibration table which shows the distance values of distortion $\delta s'$ at certain intervals of $s'$ or at certain values of angle $\alpha'$, where $\alpha'$ is the angle between the line from the projection centre to the principal point and the line from the projection centre to the point in question. In either case it is practical to convert the table to a form which shows the values $\delta s'/s'$ as a function of $$s'^2$$

By the use of a function generator values of $\delta s'/s'$ for given values of $$s'^2$$

may be obtained, and corrections for $\Delta X'$, $\Delta Y'$, $\Delta X''$ and $\Delta Y''$ may be provided using an arrangement analogous to that used for the derivation of corrections for atmospheric refraction.

In photogrammetry there are two differetn types of film shrinkage to be considered:

Firstly, regular film shrinkage which is considered to be linear with respect to $X_{pp}$ and $Y_{pp}$ but having a different value for the two coordinate directions, and Secondly, irregular film shrinkage which is non-linear and causes local distortion within a relatively limited area of the photographic image. Irregular film shrinkage may be detected using the known "réseau technique." The present invention could provide a compensation for both types of film shrinkage. However, compensation for irregular film shrinkage may be considered impractical at the present stage of development of the photogrammetric art, since its value is very small and its detection somewhat costly.

If there is linear film shrinkage error which is the same in both $X_{pp}$ and $Y_{pp}$ directions it may easily be corrected by changing the focal distance for the photograph concerned, that is by alteration of the value of $f$ for that photograph as set on the computer. The adjustment in value of $f$ is a normal practice in photogrammetry. Where the shrinkage is not the same in both the X and Y directions it would be necessary to add a linear correction to one of the coordinates. A simple servo and potentiometer multiplication circuit could achieve this to give a correction, $\Delta Y'_{fs} = K \cdot Y_{pp}$ for the first photograph (where $\Delta Y'_{fs}$ is the correction required, and K is a constant). This value of $\Delta Y'_{fs}$ would then be added to the other corrections in amplifier 146. A similar correction could be obtained for the second photograph.

It will be clear to those skilled in the art that other corrections could be provided if deemed necessary.

It will be appreciated that whilst the foregoing description has had particular reference to the method and apparatus for making maps of the earth's surface, they may be employed for measuring the coordinates of any 3-dimensional system displayed on a pair of overlapping photographs. As an example the vertical side of a house, or the surface of a body seen through a microscope might be mapped conveniently.

My invention will lend itself conveniently to use in automation systems and in this case the eyes of the human observer could be replaced by electronic scanner. Comparison of the two fields of view electronically would then be possible to determine and correct for parallax. The arranging of the viewing assembly so that the binocular units move relatively to fixedly supported photos could conveniently be devised, but will not depart from the spirit of the invention. In certain cases it may be desirable to employ a digital rather than the analogue computer described, this will require appropriate changes in the construction of the viewing assembly.

When it is desired to measure merely the coordinates of a surface the viewing assembly may be used directly as a stereo comparator, unattached to a plotting table. The invention is particularly useful in this function as parallaxes are removed merely by alteration of the height potentiometer knob 7.

The formulae of Equations 14 and 15 may be modified to fit different computation methods and computer design, or simplified to yield limited accuracy only. We may for example accept a first order approximation for A (see Equation 8) i.e.

$$A \approx y \frac{\tan \omega}{C} - x \frac{\tan \phi}{C} = yC_1 - xC_2$$

and where $C_1$ and $C_2$ are constants and C is given by Equation 10. We may assume further that the difference between coordinates in a system where the nadir point is the origin and in another system where the principal point is the origin is negligible, as far as computation of the camera inclination is concerned. This is justified if the inclination is small and we may write $$A \approx (Y - \beta Y) C_1 \left( X - \frac{Bx}{2} \right) C_2$$

that $$f \tan \frac{\omega}{2} \approx \frac{f^2 C_1}{2}$$

and that $$f \tan \frac{\phi}{2} \approx \frac{f^2 C_2}{2}$$

If we assume relatively flat terrain and small $\Delta Z$ values we may write further $$\frac{\Delta Z + \beta Z}{f - (\Delta Z + \beta Z)} \approx \frac{\Delta Z}{f - \Delta Z} + \frac{\beta Z}{f}$$

We can also add a small correction $\Delta K$ which is due to residual relative rotation between the photographs. The effect of this is to change $\Delta X'$ and $\Delta Y'$ by $$\Delta K \cdot (Y - \beta Y')$$

and by $$-\Delta K \left( X - \frac{Bx}{2} \right)$$

respectively.

Substituting these expressions in the accurate formulae of Equations 14 and 15, we obtain

(30) $\Delta X' = C_1 \cdot \left( X - \frac{Bx}{2} \right) \cdot (Y - \beta Y') - C_2 \cdot \left( X - \frac{Bx}{2} \right)^2$ $$-\frac{\Delta Z}{f - \Delta Z} \cdot \left( X - \frac{Bx}{2} \right) + C_3 \cdot \left( X - \frac{Bx}{2} \right) + C_4 \cdot (Y - \beta Y') + C_5$$

and

(31) $\Delta Y' = C_1 (Y - \beta Y')^2 - C_2 \left( X - \frac{Bx}{2} \right) \cdot (Y - \beta Y')$ $$-\frac{\Delta Z}{f - \Delta Z} \cdot (Y - \beta Y') + C_3 (Y - \beta Y') - C_4 \left( X - \frac{Bx}{2} \right) + C_6$$

where $C_3$, $C_4$, $C_5$ and $C_6$ are constants. Similar formulae may be obtained for the second photograph, for $\Delta X''$ and $\Delta Y''$.

The simplicity of the approximate formulae of Equations 30 and 31 will be appreciated, and the consequent decrease in complexity of the computer, be it electronic or mechanical, for solving them, in many cases where extreme accuracy is not required, will warrant their use.

I claim:

1. A photogrammetric plotter comprising: a base; a main carriage mounted on said base so as to have two degrees of freedom of movement relatively to said base, said degrees of movement defining a datum plane; first and second photo carriers each mounted on said main carriage so as to be movable relatively thereto with two degrees of freedom of movement, each of said last mentioned degrees of freedom of movement having components parallel to the datum plane and each such photo-carrier defining a photo-supporting surface adapted to receive one of a pair of overlapping photographs; a first operating means for controlling both said movements of said main carriage; first and second driving means for controlling respectively both said movements of said first photo-carrier; third and fourth driving means for controlling respectively both said movements of said second photo-carrier; a viewer device having measuring mark means associated with each photo-supporting surface; signal generating means sensitive to said movements of said main carriage upon operation of said first operating means; an electronic computer having an input and an output, said input being connected to receive signals from said signal generating means; second signal-generating means connected to said computer input for imparting thereto a signal corresponding to a parallax observed between said measuring mark means and an image feature when viewing overlapping photographs placed on each said photo-supporting surface, said computer generating output signals in accordance with said input signals and predetermined settings corresponding to known photo characteristics and means for applying said output signals to said first, second, third and fourth driving means whereby to remove said parallax.

2. A photogrammetric plotter comprising: a base; a main carriage mounted on said base so as to be movable relatively to said base in a plane in two directions at right angles, said plane defining a datum plane, first and second photo-carriers each mounted on said main carriage so as to be movable relatively thereto with two degrees of freedom of translational movement and one degree of freedom of rotation, said last-mentioned three degrees of freedom of movement each having a component parallel to the datum plane, each photo-carrier defining a photo-supporting surface, each such surface adapted to receive one of a pair of overlapping photographs; a first operating means for controlling movements in both said directions of the main carrier; first and second driving means for controlling respectively both said translational movements of said first photo-carrier; third and fourth driving means for controlling respectively both said translational movements of said second photo-carrier; a viewer device having measuring mark means associated with each photo-supporting surface; signal generating means sensitive to the movements of said main carriage to produce signals corresponding thereto; an electronic computer having an input and an output, said input being connected to receive signals from said signal generating means; second signal generating means connected to said computer input for imparting thereto a signal corresponding to a parallax observed between said measuring mark means and an image feature when viewing overlapping photographs on each said photo-supporting surface, said computer generating output signals in accordance with said input signals and predetermined settings corresponding to known photo characteristics; and means for applying said output signals to said first, second, third and fourth driving means whereby to remove said parallax.

3. A photogrammetric plotter as defined in claim 2 wherein said two degrees of freedom of translational movement of said photo-carriers are in a plane parallel to the datum plane.

4. A photogrammetric plotter as defined in claim 1, wherein said photo-supporting surfaces are planar, said planar surfaces being mutually parallel and also parallel to the datum plane.

5. A photogrammetric plotter comprising: a base; a main carriage mounted on said base so as to be movable relatively to said base in a plane in two directions mutually at right angles, said plane defining a datum plane; first and second photo-carriers each mounted on said main carriage so as to be movable in a plane in two directions mutually at right angles, such two directions being parallel to the directions of movement of the main carriage, each photo-carrier defining a planar photo-supporting surface, said photo-supporting surface adapted to be rotatable in its plane and adapted to receive one of a pair of overlapping photographs; a first operating means for controlling movements in both said directions of the main carriage; first and second driving means for controlling respectively movements in one and other of the said directions of the first photo-carrier; third and fourth driving means for controlling respectively movements in one and other of the said directions of the second photo-carrier; a binocular viewer having one optical system associated with each photo-supporting surface and a measuring mark also associated therewith; signal generating means sensitive to the movements of said main carriage; an electronic computer having an input and an output, said input being connected to receive signals from said signal generating means; second signal generating means connected to said computer input for imparting thereto a signal corresponding to a parallax observed between said measuring marks and an image feature when viewing overlapping photographs on each of said photo-supporting surface through the binocular viewer, said computer generating output signals in accordance with said input signals and predetermined settings corresponding to known photo characteristics; means for applying said output signals to said first, second, third and fourth driving means whereby to remove said parallax; and said second signal generating means being adapted to provide an indication determined by the height of a point represented by said image feature.

6. A method of photogrammetric plotting comprising mounting a pair of overlapping photographs on a pair of photo-carriers, viewing said photographs simultaneously to observe the parallax between the two representations of a single image feature in relation to measuring mark means, moving the two photo-carriers as a unit relatively to the measuring mark means, detecting two coordinates of such movement, and generating signals corresponding thereto, feeding said signals to the input of an electronic computer, applying settings to the computer corresponding to known photo characteristics, feeding further signals determined by said observed parallax to said computer, calculating in said computer a group of output signals for each said photo-carrier, and moving said photo-carriers relatively to one another and to said measuring mark means in accordance with said output signals, said signals being of such nature as to effect relative movements of said photo-carriers such as to bring each representation of said image feature into coincidence with said measuring mark means.

7. A photogrammetric plotter as defined in claim 1 wherein said known photo characteristics comprise shifts of the image feature on at least one of said overlapping photographs from true central projection due to tilt of the photographing camera of said one photograph and said computer comprises third means for generating signals dependent upon predetermined settings corresponding to said tilt and means for influencing the signal imparted to said computer by said second signal generating means, in accordance with signals from the third signal generating means.

8. A photogrammetric plotter as defined in claim 7 wherein said computer comprises means for providing signals dependent upon the distance of said image feature from a chosen point on each of said over-lapping photographs, and means for generating correcting signals for said output signals in accordance with said distance dependent signals.

9. A photogrammetric plotter as defined in claim 8 wherein said chosen point is the nadir point for each photograph.

10. A photogrammetric plotter as defined in claim 8 wherein said chosen point is the principal point for each photograph.

References Cited in the file of this patent

UNITED STATES PATENTS

| | | |
|---|---|---|
| 2,387,555 | Bauersfeld | Oct. 23, 1945 |
| 2,444,815 | Edison | July 6, 1948 |
| 2,647,318 | Grondona | Aug. 4, 1953 |
| 2,785,599 | Sonnberger et al. | Mar. 19, 1957 |

FOREIGN PATENTS

| | | |
|---|---|---|
| 764,449 | Great Britain | Dec. 28, 1956 |